(12) United States Patent
Zander et al.

(10) Patent No.: US 8,501,903 B2
(45) Date of Patent: Aug. 6, 2013

(54) UREA-BONDED ALKOXYSILANES FOR USE IN SEALANTS AND ADHESIVES

(75) Inventors: Lars Zander, Rommerskirchen (DE); Christiane Kunze, Cologne (DE); Johann Klein, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/456,314

(22) Filed: Apr. 26, 2012

(65) Prior Publication Data

US 2012/0238695 A1    Sep. 20, 2012

Related U.S. Application Data

(63) Continuation of application No. PCT/EP2010/066592, filed on Nov. 2, 2010.

(30) Foreign Application Priority Data

Oct. 30, 2009    (DE) .......................... 10 2009 046 269

(51) Int. Cl.
   *C08G 65/02*    (2006.01)

(52) U.S. Cl.
   USPC ........................................ 528/403

(58) Field of Classification Search
   USPC ........................................ 528/403
   See application file for complete search history.

(56) References Cited

U.S. PATENT DOCUMENTS

| | | | |
|---|---|---|---|
| 3,632,557 A | 1/1972 | Brode et al. | |
| 3,971,751 A | 7/1976 | Isayama et al. | |
| 3,979,344 A | 9/1976 | Bryant et al. | |
| 4,067,844 A | 1/1978 | Barron | |
| 4,222,925 A | 9/1980 | Bryant et al. | |
| 4,472,560 A | 9/1984 | Kuyper et al. | |
| 4,477,589 A | 10/1984 | van der Hulst et al. | |
| 4,956,433 A | 9/1990 | Mezger | |
| 4,960,844 A | 10/1990 | Singh | |
| 5,130,382 A | 7/1992 | Speranza et al. | |
| 5,525,654 A | 6/1996 | Podola et al. | |
| 5,554,709 A | 9/1996 | Eimmerling et al. | |
| 5,990,257 A | 11/1999 | Johnston et al. | |
| 6,124,387 A | 9/2000 | Wang et al. | |
| 6,545,087 B1 | 4/2003 | Walter et al. | |
| 7,294,665 B1 | 11/2007 | Lim | |
| 2002/0002231 A1 | 1/2002 | Merz et al. | |
| 2003/0153712 A1 | 8/2003 | Ludewig et al. | |
| 2011/0071254 A1 | 3/2011 | Bachon et al. | |

FOREIGN PATENT DOCUMENTS

| | | |
|---|---|---|
| CN | 1459332 | 12/2003 |
| DE | 2754545 | 7/1978 |
| DE | 4029504 | 3/1992 |
| DE | 4029505 | 3/1992 |
| DE | 19849817 | 5/2000 |
| DE | 10204523 | 8/2003 |
| DE | 102008020980 | 10/2009 |
| EP | 70475 | 1/1983 |
| EP | 0096249 | 12/1983 |
| EP | 0205846 | 12/1986 |
| EP | 0237792 | 9/1987 |
| EP | 370464 | 5/1990 |
| EP | 449419 | 10/1991 |
| EP | 601021 | 6/1994 |
| EP | 0520426 | 4/1996 |
| EP | 1093482 | 4/2001 |
| EP | 1204687 | 10/2004 |
| EP | 1621568 | 2/2006 |
| EP | 1149856 | 10/2011 |
| EP | 1888663 | 10/2011 |
| WO | 9723544 | 7/1997 |
| WO | 9928363 | 6/1999 |
| WO | 02102812 | 12/2002 |
| WO | 2005047394 | 5/2005 |
| WO | 2006088839 | 8/2006 |
| WO | 2006100219 | 9/2006 |
| WO | 2007003791 | 1/2007 |
| WO | 2007037915 | 4/2007 |

OTHER PUBLICATIONS

International Search Report issued in connection with International Patent Application No. PCT/EP2010/066592 mailed Mar. 31, 2011.

*Primary Examiner* — Kuo-Liang Peng
(74) *Attorney, Agent, or Firm* — James E. Piotrowski; Steven C. Bauman

(57) ABSTRACT

The invention relates to reactive, urea-bonded alkoxysilanes based on polyether block copolymers reacted with diisocyanate, said copolymers being of the structure $B-A_n$, in which the central block B consists of polyoxytetramethylene, polyoxyethylene, polybutadiene, polyisoprene, polyacrylate, polymethacrylate, polyamide, polyurethane or polyester units and the blocks A consist of polyoxypropylene units, and to a method for producing such alkoxysilanes. Preparations containing one or more urea-bonded alkoxysilanes can be used as an adhesive, sealant or coating agent.

15 Claims, No Drawings

UREA-BONDED ALKOXYSILANES FOR USE IN SEALANTS AND ADHESIVES

The present invention relates to moisture-crosslinking, curable prepolymer compositions based on urea-bonded alkoxysilanes and to their production and use in adhesives, sealants and coating agents.

Polymer systems having reactive alkoxysilyl groups are known. In the presence of atmospheric moisture these alkoxysilane-terminated polymers are capable even at room temperature of fusing with one another and eliminating the alkoxy groups. Depending on the content of alkoxysilyl groups and their structure, this causes mainly long-chain polymers (thermoplastics), relatively coarse-meshed three-dimensional networks (elastomers) or highly crosslinked systems (thermosets) to form.

The polymers usually have an organic backbone bearing alkoxysilyl groups at the ends. The organic backbone can be polyurethane, polyester, polyether, etc., for example.

One-component, moisture-curing adhesives and sealants have played a significant role in many technical applications for years. In addition to the polyurethane adhesives and sealants having free isocyanate groups and the traditional silicone adhesives and sealants based on dimethyl polysiloxanes, the use of so-called modified silane adhesives and sealants has also gained ground in recent times. In this last group the main component of the polymer backbone is a polyether and the reactive, crosslinkable end groups are alkoxysilyl groups. As compared with polyurethane adhesives and sealants, modified silane adhesives and sealants have the advantage of being free from isocyanate groups, in particular monomeric diisocyanates, and they are also distinguished by a broad spectrum of adhesion on a wide range of substrates without surface pretreatment with primers.

U.S. Pat. No. 4,222,925 A and U.S. Pat. No. 3,979,344 A describe siloxane-terminated organic sealant compositions that are curable even at room temperature, based on reaction products of isocyanate-terminated polyurethane prepolymers with 3-aminopropyl trimethoxysilane or 2-aminoethyl-, 3-aminopropyl methoxysilane to form isocyanate-free siloxane-terminated prepolymers. However, adhesives and sealants based on these prepolymers have unsatisfactory mechanical properties, particularly in terms of their elongation and tear strength.

The methods listed below for producing silane-terminated prepolymers based on polyethers have already been described:

Copolymerization of unsaturated monomers with examples having alkoxysilyl groups, such as e.g. vinyl trimethoxysilane.

Grafting of unsaturated monomers such as vinyl trimethoxysilane onto thermoplastics such as polyethylene.

Hydroxy-functional polyethers are reacted with unsaturated chlorine compounds, e.g. allyl chloride, in an ether synthesis to form polyethers having terminal olefinic double bonds, which in turn are reacted with hydrosilane compounds having hydrolyzable groups, such as e.g. $HSi(OCH_3)_3$, in a hydrosilylation reaction under the catalytic influence of for example transition metal compounds of the $8^{th}$ group to form silane-terminated polyethers.

In another method the polyethers containing olefinically unsaturated groups are reacted with a mercaptosilane such as for example 3-mercaptopropyl trialkoxysilane.

In a further method hydroxyl-group-containing polyethers are first reacted with diisocyanates or polyisocyanates, which are then in turn reacted with amino-functional silanes or mercapto-functional silanes to form silane-terminated prepolymers.

A further possibility provides for reacting hydroxy-functional polyethers with isocyanato-functional silanes such as for example 3-isocyanatopropyl trimethoxysilane.

These production methods and the use of the aforementioned silane-terminated prepolymers in adhesive/sealant applications are mentioned for example in the following patents: U.S. Pat. No. 3,971,751, EP-A-70475, DE-A-19849817, U.S. Pat. No. 6,124,387, U.S. Pat. No. 5,990,257, U.S. Pat. No. 4,960,844, U.S. Pat. No. 3,979,344, U.S. Pat. No. 3,971,751, U.S. Pat. No. 3,632,557, DE-A-4029504, EP-A-601021 or EP-A-370464.

DE 2754545 A describes a method for producing a sealant that is said to exhibit improved adhesion. According to this method a polyol having a hydroxyl functionality of greater than 2 and an average molecular weight in the range from approximately 1000 to 15,000 should be reacted with a polyisocyanate in stoichiometric excess, such that a polyurethane prepolymer having terminal NCO groups is obtained. Then at least 1% of the terminal NCO groups should be reacted with an amino-functional alkoxysilane, the amino group of the silane being a secondary amino group. The reaction product of a mercaptosilane with a monoepoxide or a reaction product of an epoxysilane with a secondary amine can supposedly also be used in place of the aminosilane. Fillers and pigments should moreover be added to the silane-modified polyurethane polymer formed in this way.

Solvent-free or low-solvent pressure-sensitive adhesives based on resin mixtures, which are liquid at temperatures of up to 100° C. and which crosslink either at elevated temperature or under the influence of moisture, are known from EP0096249 A1. The thermal crosslinking should take place at temperatures of 100° C. or higher, preferably at approximately 120° C. According to the teaching of this document the adhesive compositions contain one or more mutually compatible polymers containing hydroxyl groups and having a molecular weight of 500 to 30,000, at least 5% and no more than 90% of the hydroxyl groups therein being replaced by alkoxysilyl groups. The alkoxysilyl groups should be introduced by reacting a diisocyanate firstly with a hydroxyl group on the polymer and secondly with an aminosilane or mercaptosilane ester. Owing to their liquid to viscous consistency at room temperature or at moderately elevated temperature the resins should be able to be applied in a thin layer on substrates for self-adhesive products without the use of a solvent, where they can then easily be cured to form pressure-sensitive adhesives.

WO2002/102812 A1 describes silane-containing unsaturated organic compounds in which the silane groups are bonded to the polymer backbone by means of urea groupings. Emulsions of these polymers are said to be suitable as constituents of adhesives, sealants or coating materials.

WO2005/047394 A1 discloses crosslinkable compositions that can be produced using a mixture of two or more polyols, to which end at least two different polyoxyalkylenes should be used, at least a first oxyalkylene unit having at least two C atoms between two adjacent oxygen atoms and at least a second oxyalkylene unit having at least one more C atom between two adjacent oxygen atoms than the first oxyalkylene unit. The reaction of a mixture of polypropylene glycol and poly-THF with toluoylene diisocyanate and subsequent reaction with isocyanatopropyl trimethoxysilane to form a moisture-curing polymer is described by way of example.

Crosslinkable silane-terminated polymers are known from WO2006/088839 A1 which encompass the reaction product of an isocyanate-terminated prepolymer with a silane that contains a plurality of hydrolyzable groups and at least one isocyanate-reactive group with active hydrogen. The silane should release a reduced proportion of volatile organic compounds during hydrolysis in comparison to silanes having an equivalent number of hydrolyzable groups that are all alkoxy groups.

WO2007/037915 A2 describes the production of aminosilane-terminated polymers by silylation of isocyanate-terminated polyurethane prepolymers using zinc or bismuth catalysts. These prepolymers are said to exhibit increased stability in respect of atmospheric moisture. These polymers are said to be very suitable for use as sealants, adhesives or for the production of protective coatings.

DE 10 2008 020 980 A1 describes a silylated polyurethane produced by reacting at least one polyether compound having an OH value in accordance with DIN 53783 of between 3 and 20 mg KOH/g and consisting of at least two polyoxyalkylene blocks A and B, wherein the number of carbon atoms in the alkylene units of blocks A and B differs by at least one, with one or more isocyanatosilanes of the formula OCN—R—Si—$(R^1)_m$(—$OR^2)_{3-m}$, in which m is 0, 1 or 2, each $R^2$ is an alkyl residue having 1 to 4 carbon atoms, each $R^1$ is an alkyl residue having 1 to 4 carbon atoms and R is a difunctional organic group, in order to cap the hydroxyl groups of the prepolymer with the isocyanatosilane, causing a silylated polyurethane to form that has alkoxysilyl groups as reactive end groups. The silylated polyurethanes described are suitable for producing adhesive, sealant or coating agent preparations having good mechanical properties.

Despite the extensive prior art there is still a demand for improved alkoxysilane compositions that are suitable for use as adhesives, sealants or coatings. In particular the raw materials used should be easily and inexpensively obtainable. Better compatibility of the individual polymer components is desirable for a problem-free application. Furthermore, the adhesives or sealants should have a broad spectrum of adhesion to a large number of substrates and as high as possible a strength level after curing.

The manner in which the object is achieved according to the invention can be ascertained from the claims. It consists substantially in the provision of reactive, urea-bonded alkoxysilanes, obtainable by reacting an OH-terminated polyether block copolymer of the structure B-$A_n$, in which n is equal to 2 to 10, in particular 2 to 6, preferably 2 or 3, and in which the central block B consists of polyoxytetramethylene, polyoxyethylene, polybutadiene, polyisoprene, polyacrylate, polymethacrylate, polyamide, polyurethane or polyester units and the blocks A consist of polyoxypropylene units, with a stoichiometric excess of diisocyanate to form an NCO-terminated prepolymer Q; and subsequent reaction of the prepolymer Q with a silane compound of the formula (1),

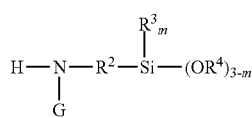

(1)

in which G is an organic group or hydrogen, $R^2$ is a divalent alkylene group having 1 to 10 carbon atoms or a —$(CH_2)_o$—$NR^1$—$(CH_2)_p$ group, in which o and p are identical or different and equal to 2 to 6, preferably 2 and/or 3, and $R^1$ is an organic group having a maximum of 10 carbon atoms, $R^3$ is a linear or branched alkyl residue having 1 to 6 carbon atoms, $R^4$ is a linear or branched alkyl residue having 1 to 4 carbon atoms and m is equal to 0, 1 or 2.

According to a preferred embodiment $R^2$ is a divalent alkylene group having 1 to 4 carbon atoms, in particular 1 or 3 carbon atoms. m is preferably equal to 0 or 1.

$R^3$ and $R^4$ are preferably independently of each other methyl, ethyl, propyl or butyl residues, in particular methyl or ethyl residues. Methyl residues are particularly preferred.

A stoichiometric excess of diisocyanate is understood to be a ratio of isocyanate groups in the diisocyanate to OH groups in the polyether block copolymer that is greater than 1, preferably equal to or greater than 1.05:1, in particular equal to or greater than 1.1:1 and particularly preferably equal to or greater than 1.2:1.

Urea-bonded alkoxysilanes of the general formula (6) are substantially formed accordingly

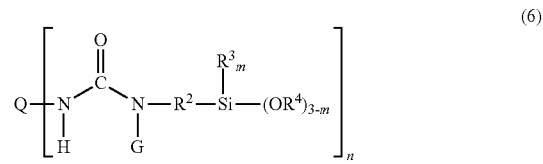

(6)

in which m is equal to 0, 1 or 2, n is equal to 2 to 10, in particular 2 to 6, preferably 2 or 3, Q is an n-valent residue of an NCO-terminated prepolymer without the already reacted terminal isocyanate groups, the prepolymer being obtainable by reacting an OH-terminated polyether block copolymer of the structure B-$A_n$, in which n has the meaning given above and in which the central block B consists of polyoxytetramethylene, polyoxyethylene, polybutadiene, polyisoprene, polyacrylate, polymethacrylate, polyamide, polyurethane or polyester units and the blocks A consist of polyoxypropylene units, with diisocyanate, G is an organic group or hydrogen, $R^2$ is a divalent alkylene group having 1 to 10 carbon atoms or a —$(CH_2)_o$—$NR^1$—$(CH_2)_p$ group, in which o and p are identical or different and equal to 2 to 6, preferably 2 and/or 3, and $R^1$ is an organic group having a maximum of 10 carbon atoms, $R^3$ is a linear or branched alkyl residue having 1 to 6 carbon atoms, and $R^4$ is a linear or branched alkyl residue having 1 to 4 carbon atoms.

A urea-bonded alkoxysilane according to the invention is understood to be an alkoxysilane-terminated prepolymer whose alkoxysilane-functionalized end groups are bonded to the polymer backbone by means of a urea or carbamide binding group.

The invention also provides a method for producing a urea-bonded alkoxysilane or a composition containing urea-bonded alkoxysilanes, encompassing the reaction of at least one OH-terminated polyether compound of the structure B-$A_n$, in which n is equal to 2 to 10, in particular 2 to 6, preferably 2 or 3, and the central block B consists of polyoxytetramethylene, polyoxyethylene, polybutadiene, polyisoprene, polyacrylate, polymethacrylate, polyamide, polyurethane or polyester units and the blocks A consist of polyoxypropylene units, with a stoichiometric excess of a diisocyanate to form an NCO-terminated prepolymer, followed by the reaction of this prepolymer having reactive isocyanate groups with a silane compound of the formula (1),

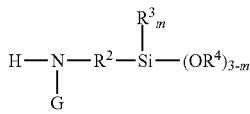
(1)

in which G is an organic group or hydrogen, $R^2$ is a divalent alkylene group having 1 to 10 carbon atoms or a —$(CH_2)_o$—$NR^1$—$(CH_2)_p$ group, in which o and p are identical or different and equal to 2 to 6, preferably 2 and/or 3, and $R^1$ is an organic group having a maximum of 10 carbon atoms, $R^3$ is a linear or branched alkyl residue having 1 to 6 carbon atoms, $R^4$ is a linear or branched alkyl residue having 1 to 4 carbon atoms and m is equal to 0, 1 or 2.

The OH-terminated polyether compound having the structure $B$-$A_n$ preferably has an OH value in accordance with DIN 53783 of between 3 and 56 mg KOH/g.

According to a preferred embodiment $R^2$ is a divalent alkylene group having 1 to 4 carbon atoms, in particular 1 or 3 carbon atoms. m is preferably equal to 0 or 1.

$R^3$ and $R^4$ are preferably independently of each other methyl, ethyl, propyl or butyl residues, in particular methyl or ethyl residues. Methyl residues are particularly preferred.

In the aforementioned production method, following the reaction of the OH-terminated or OH-functional polyether compound with the diisocyanate, the unreacted monomeric diisocyanate can optionally be removed from the reaction mixture before the NCO-terminated prepolymer is reacted further with the silane compound of formula (1).

The invention also provides preparations containing at least one aforementioned urea-bonded alkoxysilane for use as a one-component moisture-curing adhesive and/or sealant or for use as a coating agent.

In addition to the urea-bonded alkoxysilane prepolymers according to the invention, the aforementioned preparations (adhesive and sealant preparations or coating agents) can also containing auxiliary substances and additives, such as plasticizers, fillers, catalysts and further auxiliary substances and additives.

If the group G in formulae (1) and (6) is not hydrogen, it can preferably be represented by one of the formulae (2) to (5):

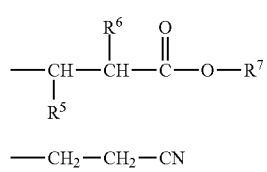
(2)

—$CH_2$—$CH_2$—$CN$  (3)

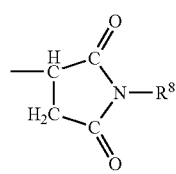
(4)

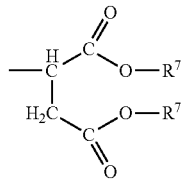
(5)

$R^5$ and $R^6$ can independently of each other be a hydrogen atom or a methyl group, $R^7$ a linear or branched alkyl residue having 1 to 6 carbon atoms and $R^8$ a linear or branched alkyl residue having 1 to 8 carbon atoms.

The following particularly preferred combinations result for formula (2):

| $R^5$ | $R^6$ | $R^7$ |
|---|---|---|
| H | H | Methyl group |
| H | H | Ethyl group |
| H | H | Propyl group |
| H | H | n-Butyl group |
| H | H | Isobutyl group |
| H | H | tert-Butyl group |
| H | H | Pentyl group |
| H | H | Hexyl group |
| H | Methyl group | Methyl group |
| H | Methyl group | Ethyl group |
| H | Methyl group | Propyl group |
| H | Methyl group | n-Butyl group |
| H | Methyl group | Isobutyl group |
| H | Methyl group | tert-Butyl group |
| H | Methyl group | Pentyl group |
| H | Methyl group | Hexyl group |

The combinations listed above are however also possible where $R^5$ is a methyl group and $R^6$ is a hydrogen atom, with $R^7$ being a methyl, ethyl, propyl, n-butyl, isobutyl, tert-butyl, pentyl or hexyl group, or where $R^5$ and $R^6$ are methyl groups, with $R^7$ being a methyl, ethyl, propyl, n-butyl, isobutyl, tert-butyl, pentyl or hexyl group.

Formula (2) most particularly preferably denotes 3-butyric acid alkyl ester (3-alkyl butyrate) or propanoic acid alkyl ester residues, in particular the residues derived from methyl acrylate, ethyl acrylate, n-butyl acrylate, tert-butyl acrylate, methyl methacrylate, ethyl methacrylate, n-butyl methacrylate or tert-butyl acrylate.

For formula (4) $R^8$ is preferably a methyl, ethyl, propyl, n-butyl, isobutyl or tert-butyl group.

For formula (5) $R^7$ is preferably a methyl, ethyl, propyl, n-butyl, isobutyl or tert-butyl group.

The group G can however also be a linear or branched alkyl residue having 1 to 12 carbon atoms, in particular a methyl, ethyl, propyl, n-butyl or cyclohexyl group, or an aromatic residue having 6 to 12 carbon atoms, in particular a phenyl or aniline residue.

The polyether block copolymers of the structure $B$-$A_n$ preferably have a molecular weight ($M_n$) of between 4000 and 100,000 g/mol (daltons), by preference between 6000 and 30,000 g/mol, in particular between 7500 and 18,000 g/mol and most particularly preferably between 8000 and 12,000 g/mol (daltons), and the polyether blocks A preferably have a polydispersity PD ($M_w/M_n$) of less than 2.5, by preference between 1.00 and 2.00, particularly preferably between 1.10 and 1.50. The preferred OH value in accordance with DIN 53783 is between 3 and 56 mg KOH/g. n is preferably equal to 2 or 3, in particular 2.

The molecular weight $M_n$ is understood to be the number-average molecular weight of the polymer. Like the weight-average molecular weight $M_w$, this can be determined by gel permeation chromatography (GPC, also known as SEC). This method is known to the person skilled in the art. The polydispersity derives from the average molecular weights $M_w$ and $M_n$. It is calculated as $PD=M_w/M_n$.

The polyether block copolymer necessary for the reaction according to the invention with diisocyanates consists of at least two polyoxypropylene blocks A and a central polymer block B. Such a polyoxypropylene block copolymer can be produced from an at least bifunctional polymer compound B having at least two terminal hydroxyl groups, onto which the polyoxypropylene block A is polymerized.

Hydroxy-functional polyoxytetramethylene, polyoxyethylene, polybutadiene, polyisoprene, polyacrylate, polymethacrylate, polyamide, polyurethane or polyester units are suitable in particular as the starter compound B.

Hydroxy-functional polyoxytetramethylenes (also known as polytetrahydrofurans or "poly-THF") are available commercially from a large number of manufacturers in suitable molecular weight ranges (approx. 800 to 6000). Likewise the corresponding hydroxy-functional polyoxyethylenes (polyethylene oxides), polyesters, polybutadienes or polyisoprenes are available commercially. Polyacrylates or polymethacrylates can be produced in accordance with the teaching of EP 0 205 846 A1, EP 0237792 A1 or WO 99/28363 A1. The corresponding polyamide derivatives can be produced by the condensation known per se of di- or polycarboxylic acids and diamines with the added use of hydroxycarboxylic acids, as is disclosed for example in EP449419 A1 or U.S. Pat. No. 5,130,382 A. Hydroxy-functional polyurethanes can be produced in a known manner from di- or polyisocyanates with a stoichiometric excess of one or more polyols.

The starter polyol B preferably has an average molecular weight from 500 to 10,000 g/mol (daltons), by preference the average molecular weight range of the starter block B is between 1000 and 5000 g/mol (daltons), in particular between 2000 and 4000 g/mol. The propoxylation can take place with DMC catalysis, catalysis by one or more phosphazene and/or porphyrin derivatives or alkali metal catalysis, in particular Cs catalysis, preferably with DMC catalysis.

Particularly advantageous viscoelastic properties of the prepolymers to be produced are achieved if the polyoxypropylene polymer blocks A polymerized onto the starter polyol B have a narrow molar mass distribution and hence a low polydispersity. This can be achieved for example by using a double metal cyanide catalyst (DMC catalyst) as the alkoxylation catalyst. Examples of such DMC catalysts are zinc hexacyanocobaltate (II), zinc hexacyanoferrate (III), zinc hexacyanoferrate (II), nickel (II) hexacyanoferrate (II) and cobalt (II) hexacyanocobaltate (III). Such DMC catalysts are described for example in WO 2006/100219 A1 and in the literature cited therein.

Most particularly suitable for the polymerization according to the invention of the polyoxypropylene polymer blocks A are the DMC catalysts known from U.S. Pat. No. 4,477,589 and U.S. Pat. No. 4,472,560 having the general formula

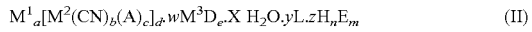

$$M^1_a[M^2(CN)_b(A)_c]_d \cdot wM^3D_e \cdot X\ H_2O \cdot yL \cdot zH_nE_m \qquad (II)$$

in which $M^1$ denotes an at least divalent metal atom selected from Zn(II), Fe(II), Co(II), Ni(II), Mn(II), Cu(II), Sn(II) or Pb(II) and $M^2$ is at least one of the di-, tri-, tetra or pentavalent metals Fe(II), Fe(III), Co(III), Cr(III), Mn(II), Mn(III), Ir(III), Rh(III), Ru(II), V(IV) or V(V). $M^3$ can be $M^1$ and/or $M^2$ and A, D and E each denote an anion, which can be identical or different. L is a solvent ligand selected from an alcohol, aldehyde, ketone, ether, ester, amide, nitrile or sulfide or a mixture thereof; a and d are numbers corresponding to the valence of $M^1$ and $M^2$ in the double metal cyanide part of the general formula (II); b and c denote whole numbers (with b>c), which together with a and d give the electroneutrality of the double metal cyanide part of the general formula (II); e is a whole number corresponding to the valence of $M^3$, n and m are whole numbers giving the electroneutrality of HE; w is a number between 0.1 and 4, x a number up to 20, y a number between 0.1 and 6, and z a number between 0.1 and 5.

The DMC catalyst complexes known from CN1459332 comprising a double metal cyanide of the aforementioned type, an organic coordinating agent, a soluble metal salt, a polyether polyol and an organic polysiloxane, are also suitable for the polymerization according to the invention of the polyoxypropylene polymer blocks A. The DMC catalyst complexes known from WO97/023544 A1 are likewise suitable for producing the block copolymers for use according to the invention.

In addition to the particularly narrow molar mass distribution achievable with these catalysts, the block copolymers produced in this way are also distinguished by a high achievable average molar mass and a very low number of double bonds at the ends of the polymer chains. Such polymerizable polyether blocks A according to the invention typically have a low polydispersity PD ($M_w/M_n$) of at most 2.5, preferably between 1.01 and 1.15 and particularly preferably between 1.08 and 1.14. The products are moreover distinguished by their low terminal unsaturation, determinable by the method ASTM D4671, which is below 0.07 meq/g, in particular below 0.04 meq/g and preferably 0.02 meq/g or lower.

The polyether block copolymers of the structure (HO)-A-B-A-(OH) or B-(A-OH)$_n$ used according to the invention preferably have molecular weights ($M_n$) of between 4000 and 40,000 g/mol (daltons) and an OH value in accordance with DIN 53783 of between 3 and 20 mg KOH/g, in particular between 10 and 15 mg KOH/g.

The subsequent reaction of the polyether block copolymers of the structure B-(A-OH)$_n$ to form the NCO-terminated reactive prepolymer takes place in a manner known per se with a stoichiometric excess of a diisocyanate preferably selected from the group consisting of all isomers of toluene diisocyanate (TDI), in particular 2,4-toluene diisocyanate and 2,6-toluene diisocyanate, either in isomer-pure form or as a mixture of multiple isomers, naphthalene-1,5-diisocyanate, 4,4'-diphenylmethane diisocyanate, 2,4'-diphenylmethane diisocyanate and mixtures thereof, xylene diisocyanate (XDI), 4,4'-dicyclohexylmethane diisocyanate (H$_{12}$MDI), 1-isocyanatomethyl-3-isocyanato-1,5,5-trimethyl diisocyanate (isophorone diisocyanate, IPDI), cyclohexane-1,4-diisocyanate, hydrogenated xylylene diisocyanate (H$_6$XDI), 1-methyl-2,4-diisocyanatocyclohexane, hexane-1,6-diisocyanate (HDI), m- or p-tetramethylxylene diisocyanate (m-TMXDI, p-TMXDI) or mixtures of the aforementioned diisocyanates. The stoichiometric excess of the diisocyanate can be between 1.05 and 6:1 (ratio of NCO/OH groups).

On completion of the reaction the excess monomeric diisocyanate can be removed from the reaction mixture by distillation, extraction, chromatography or crystallization methods.

This is followed according to the invention by a reaction of the free isocyanate groups of the aforementioned polyurethane prepolymer thus obtained with an aminosilane of the general formula (1).

The aminosilane can be selected from aminoalkyl alkoxysilanes, such as 3-aminopropyl trimethoxysilane, 3-aminopropyl triethoxysilane (for example Dynasilan AMMO, Evonik or Geniosil GF 96, Wacker), N-(n-butyl)-3-aminopropyl trimethoxysilane, 3-aminopropyl methyl dimethoxysilane, 3-aminopropyl methyl diethoxysilane, N-cyclohexylaminomethyl methyl diethoxysilane, N-cyclohexylaminomethyl triethoxysilane, N-phenylaminomethyl trimethoxysilane (e.g. Geniosil XL 973, Wacker), N-cyclohexyl-3-aminopropyl trimethoxysilane, 1-anilinomethyl dimethoxymethylsilane (e.g. Geniosil XL972, Wacker), N-phenyl-3-aminopropyl trimethoxysilane (e.g. Y-9669 from Momentive) or bis(3-triethoxysilylpropyl)amine (Silquest A-1170, GE). A product of a Michael addition of one of the aforementioned aminosilanes with a (meth)acrylic acid alkyl ester, acrylonitrile, maleinimide, in particular N-alkyl maleinimide, or a maleic acid alkyl ester can however also be used, wherein of course only aminosilanes having primary amino groups can be used for the Michael addition. The following methacrylic acid alkyl esters or acrylic acid alkyl esters are suitable in particular as the (meth)acrylic acid alkyl ester: methyl acrylate, ethyl acrylate, butyl acrylate, methyl methacrylate, ethyl methacrylate, butyl methacrylate. The products of the Michael addition then contain a group G according to one of formulae (2) to (5).

The adhesive and sealant preparations or coating agents can also contain, in addition to the aforementioned reactive, urea-bonded alkoxysilanes, further auxiliary substances and additives, which impart improved elastic properties, improved resilience, a sufficiently long processing time, a fast curing speed and low residual tackiness to these preparations. These auxiliary substances and additives include for example plasticizers, stabilizers, antioxidants, fillers, reactive thinners, desiccants, adhesion promoters and UV stabilizers, rheological auxiliary agents, colored pigments or pigment pastes and/or optionally also a small amount of solvent.

Suitable plasticizers are for example adipic acid esters, azelaic acid esters, benzoic acid esters, butyric acid esters, acetic acid esters, esters of higher fatty acids having around 8 to around 44 C atoms, esters of OH-group-bearing or epoxidized fatty acids, fatty acid esters and fats, glycolic acid esters, phosphoric acid esters, phthalic acid esters, linear or branched alcohols containing 1 to 12 C atoms, propionic acid esters, sebacic acid esters, sulfonic acid esters (e.g. "Mesamoll", alkyl sulfonic acid phenyl ester, Bayer), thiobutyric acid esters, trimellitic acid esters, citric acid esters and esters based on nitrocellulose and polyvinyl acetate, as well as mixtures of two or more thereof. The asymmetrical esters of adipic acid monooctyl esters with 2-ethyl hexanol (Edenol DOA, Cognis Deutschland GmbH, Düsseldorf) or esters of abietic acid are particularly suitable.

Of the phthalic acid esters, dioctyl phthalate (DOP), dibutyl phthalate, diisoundecyl phthalate (DIUP) or butylbenzyl phthalate (BBP), or the derived hydrogenated derivatives thereof, are suitable for example, of the adipates, dioctyl adipate (DOA), diisodecyl adipate, diisodecyl succinate, dibutyl sebacate or butyl oleate are suitable.

Likewise suitable as plasticizers are the pure or mixed ethers of monofunctional, linear or branched $C_{4-16}$ alcohols or mixtures of two or more different ethers of such alcohols, for example dioctyl ether (available as Cetiol OE, Cognis Deutschland GmbH, Düsseldorf).

Also suitable as plasticizers are end-capped polyethylene glycols. For example, polyethylene or polypropylene glycol di-$C_{1-4}$ alkyl ethers, in particular the dimethyl or diethyl ethers of diethylene glycol or dipropylene glycol, and mixtures of two or more thereof, are suitable.

Particularly preferred, however, are end-capped polyethylene glycols, such as polyethylene or polypropylene glycol dialkyl ethers, the alkyl residue having one to four C atoms, and in particular the dimethyl and diethyl ethers of diethylene glycol and dipropylene glycol. With dimethyl diethylene glycol in particular, an acceptable cure is achieved even under less favorable application conditions (low atmospheric moisture, low temperature). For further details of plasticizers, reference is made to the relevant technical chemistry literature.

Plasticizers can be used in the preparations in amounts of between 0 and 40, preferably between 0 and 20 wt. % (relative to the overall composition).

"Stabilizers" are understood to be antioxidants, UV stabilizers or hydrolysis stabilizers, for example. Examples thereof are the commercial sterically hindered phenols and/or thio ethers and/or substituted benzotriazoles, such as for example Tinuvin 327 (Ciba Specialty Chemicals), and/or HALS-type amines (Hindered Amine Light Stabilizers), such as for example Tinuvin 770 (Ciba Specialty Chemicals). Within the context of the present invention it is preferable for a UV stabilizer to be used which bears a silyl group and which is incorporated into the end product on crosslinking or curing. The products Lowilite 75, Lowilite 77 (Great Lakes, USA) are particularly suitable for this purpose. Benzotriazoles, benzophenones, benzoates, cyanoacrylates, acrylates, sterically hindered phenols, phosphorus and/or sulfur can furthermore also be added. The preparation according to the invention can contain up to around 2 wt. %, preferably around 1 wt. %, of stabilizers. The preparation according to the invention can furthermore also contain up to around 7 wt. %, in particular up to around 5 wt. %, of antioxidants.

All known compounds that are capable of catalyzing the hydrolytic cleavage of the hydrolyzable groups of the silane groupings and the subsequent fusing of the Si—OH group to siloxane groupings (crosslinking reaction or adhesion-promoting function) can be used as catalysts. Examples of these are titanates such as tetrabutyl titanate and tetrapropyl titanate, tin carboxylates such as dibutyl tin dilaurate (DBTL), dibutyl tin diacetate, dibutyl tin diethyl hexanoate, dibutyl tin dioctoate, dibutyl tin dimethyl maleate, dibutyl tin diethyl maleate, dibutyl tin dibutyl maleate, dibutyl tin diisooctyl maleate, dibutyl tin ditridecyl maleate, dibutyl tin dibenzyl maleate, dibutyl tin maleate, dibutyl tin diacetate, tin octanoate, dioctyl tin disteareate, dioctyl tin dilaurate, dioctyl tin diethyl maleate, dioctyl tin diisooctyl maleate, dioctyl tin diacetate, and tin naphthenoate; tin alkoxides such as dibutyl tin dimethoxide, dibutyl tin diphenoxide, and dibutyl tin diisopropoxide; tin oxides such as dibutyl tin oxide, and dioctyl tin oxide; reaction products between dibutyl tin oxides and phthalic acid esters, dibutyl tin bisacetyl acetonate; organoaluminum compounds such as aluminum trisacetyl acetonate, aluminum trisethyl acetoacetate, and diisopropoxyaluminum ethyl acetoacetate; chelate compounds such as zirconium tetraacetyl acetonate, and titanium tetraacetyl acetonate; lead octanoate; amine compounds or salts thereof with carboxylic acids, such as butylamine, octylamine, laurylamine, dibutylamines, monoethanolamines, diethanolamines, triethanolamine, diethylene triamine, triethylene tetramine, oleylamines, cyclohexylamine, benzylamine, diethyl aminopropylamine, xylylene diamine, triethylene diamine, guanidine, diphenyl guanidine, 2,4,6-tris(dimethylaminomethyl)phenol, morpholine, N-methylmorpholine, 2-ethyl-4-methylimidazole, and 1,8-diazabicyclo-(5.4.0)-undecene-7 (DBU), a low-molecular-weight polyamide resin obtained from an excess of a polyamine and a polybasic acid, adducts of a polyamine in excess with an epoxide, silane adhesion promoters with amino groups, such as 3-aminopropyl trimethoxysilane, and N-(β-aminoethyl)aminopropylmethyl dimethoxysilane. The catalyst, preferably mixtures of several catalysts, can be used in an amount from 0.01 to around 5 wt. %, relative to the total weight of the preparation.

The preparation according to the invention can additionally contain fillers. Chalk, lime dust, precipitated and/or pyrogenic silica, zeolites, bentonites, magnesium carbonate, kieselguhr, alumina, clay, talc, titanium oxide, iron oxide, zinc oxide, sand, quartz, flint, mica, glass powder and other ground mineral substances, for example, are suitable here. Organic fillers can also be used, in particular carbon black, graphite, wood fibers, wood flour, sawdust, cellulose, cotton, pulp, cotton, wood chips, chopped straw, chaff, ground walnut shells and other chopped fibers. Short fibers such as glass fibers, glass filament, polyacrylonitrile, carbon fibers, Kevlar fibers or polyethylene fibers can moreover also be added. Aluminum powder is also suitable as a filler.

The pyrogenic and/or precipitated silicas advantageously have a BET surface area of 10 to 90 $m^2/g$. Their use brings about no additional rise in the viscosity of the preparation according to the invention but contributes to a reinforcement of the cured preparation.

It is also possible to use pyrogenic and/or precipitated silicas having a larger BET surface area, advantageously of 100 to 250 $m^2/g$, in particular 110 to 170 $m^2/g$, as a filler. By virtue of the larger BET surface area it is possible to achieve the same effect, for example reinforcement of the cured preparation, with a smaller percentage by weight of silica. In this way further substances can be used to improve the preparation according to the invention with regard to other requirements.

If a basic filler is to be used in place of acid fillers, calcium carbonates (chalks) are suitable for example, wherein cubic, non-cubic, amorphous and other modifications can be used. The chalks that are used are preferably surface-treated or coated. Fatty acids, fatty acid soaps and fatty acid esters are preferably used as coating agents, for example lauric acid, palmitic acid or stearic acid, sodium or potassium salts of such acids or alkyl esters thereof. Furthermore, however, other surface-active substances such as sulfate esters of long-chain alcohols or alkylbenzene sulfonic acids or sodium or potassium salts thereof or coupling reagents based on silanes or titanates are also suitable. An improvement in the processability and adhesive strength and also the weather resistance of the compositions is frequently associated with the surface treatment of the chalks. The coating agent is conventionally used in a proportion from 0.1 to 20 wt. %, preferably 1 to 5 wt. %, relative to the total weight of the raw chalk.

Precipitated or ground chalks can be used, depending on the desired range of properties. Ground chalks can be produced for example from natural lime, limestone or marble by mechanical grinding, wherein dry or wet methods can be used. Depending on the grinding method, fractions with differing average particle size are obtained. Advantageous specific surface area values (BET) are between 1.5 $m^2/g$ and 50 $m^2/g$.

Hollow beads having a mineral shell or a plastic shell are also suitable as fillers. These can be hollow glass beads, for example, which are available commercially under the trade name Glass Bubbles®. Plastic-based hollow beads, for example Expancel® or Dualite®, are described for example in EP 0 520 426 B1. These are composed of inorganic or organic substances, each having a diameter of 1 mm or less, preferably 500 µm or less.

Fillers that impart thixotropic properties to the preparations are preferred for some applications. Such fillers are also described as rheological auxiliary agents, for example hydrogenated castor oil, fatty acid amides or swellable plastics such as PVC. To enable them to be easily squeezed out of a suitable dispensing device (e.g. tube), such preparations have a viscosity of 3000 to 15,000, preferably 40,000 to 80,000 mPas, or also 50,000 to 60,000 mPas.

The fillers are preferably used in an amount from 1 to 80 wt. %, preferably 5 to 60 wt. %, relative to the total weight of the preparation.

Examples of suitable pigments are titanium dioxide, iron oxides or carbon black.

It often makes sense to further stabilize the preparations according to the invention against moisture penetration using desiccants, to further increase the shelf life. There is occasionally also a need to lower the viscosity of the adhesive or sealant according to the invention for certain applications through the use of a reactive thinner. All compounds which can be mixed with the adhesive or sealant to lower its viscosity and which have at least one binder-reactive group can be used as reactive thinners.

The following substances for example can be used as reactive thinners: polyalkylene glycols reacted with isocyanatosilanes (e.g. Synalox 100-50B, DOW), carbamatopropyl trimethoxysilane, alkyl trimethoxysilane, alkyl triethoxysilane, methyl trimethoxysilane, methyl triethoxysilane and vinyl trimethoxysilane (Dynasylan VTMO, Evonik or Geniosil XL 10, Wacker), vinyl triethoxysilane, phenyl trimethoxysilane, phenyl triethoxysilane, octyl trimethoxysilane, tetraethoxysilane, vinyl dimethoxymethylsilane (XL12, Wacker), vinyl triethoxysilane (GF56, Wacker), vinyl triacetoxysilane (GF62, Wacker), isooctyl trimethoxysilane (IO Trimethoxy), isooctyl triethoxysilane (IO Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyl trimethoxysilane, 3-octanoyl thio-1-propyl triethoxysilane, aminosilanes, such as e.g. 3-aminopropyl trimethoxysilane (Dynasylan AMMO, Evonik or Geniosil GF96, Wacker), and partial hydrolyzates of the aforementioned compounds.

The following polymers from Kaneka Corp can furthermore likewise be used as reactive thinners: MS S203H, MS S303H, MS SAT 010, and MS SAX 350.

Silane-modified polyethers which derive for example from the reaction of isocyanatosilane with Synalox grades can likewise be used.

Similarly, the prepolymers according to the invention can be used mixed with conventional polymers or prepolymers known per se, optionally with the additional use of the aforementioned reactive thinners, fillers and further auxiliary substances and additives. "Conventional polymers or prepolymers" can be selected from polyesters, polyoxyalkylenes, polyacrylates, polymethacrylates or mixtures thereof, wherein these can be free from groups that react with siloxane groups but can optionally also contain alkoxysilyl groups or hydroxyl groups.

Many of the aforementioned silane-functional reactive thinners simultaneously have a drying and/or adhesion-promoting action in the preparation. These reactive thinners are preferably used in amounts of between 0.1 and 15 wt. %, in particular between 1 and 5 wt. %, relative to the overall composition of the preparation.

Also suitable as adhesion promoters, however, are tackifiers such as hydrocarbon resins, phenolic resins, terpene-phenolic resins, resorcinol resins or derivatives thereof, modified or unmodified rosin acids or esters (abietic acid derivatives), polyamines, polyaminoamides, anhydrides and anhydride-containing copolymers. The addition of polyepoxide resins in small amounts can also improve adhesion on some substrates. To this end the solid epoxy resins having a molecular weight of over 700 are then preferably used in finely ground form. If tackifiers are used as adhesion promoters, the nature and amount thereof depends on the adhesive/sealant composition and on the substrate to which this is applied. Typical tackifying resins (tackifiers) such as for example terpene-phenolic resins or rosin acid derivatives can be used in concentrations of between 5 and 20 wt. %, typical adhesion promoters such as polyamines, polyaminoamides or phenolic resins or resorcinol derivatives can be used in contents of between 0.1 and 10 wt. %, relative to the overall composition of the preparation.

The preparation according to the invention is produced according to known methods by intimate mixing of the constituents in suitable dispersing units, for example high-speed mixers, compounders, planetary mixers, planetary agitators, internal mixers, Banbury mixers, twin-screw extruders and similar mixing units known to the person skilled in the art.

A preferred embodiment of a preparation according to the invention can contain:

5 to 50 wt. %, preferably 10 to 40 wt. %, of one or more compounds of the reactive, urea-bonded alkoxysilanes according to the invention, 0 to 30 wt. %, in particular less than 20 wt. %, particularly preferably less than 10 wt. %, of plasticizers, 0 to 80 wt. %, preferably 20 to 60 wt. %, particularly preferably 30 to 55 wt. %, of fillers.

The embodiment can also contain further auxiliary substances.

The entirety of all constituents adds to 100 wt. %, wherein the sum of the aforementioned main constituents alone does not have to add to 100 wt. %.

The reactive, urea-bonded alkoxysilane prepolymers according to the invention cure with ambient atmospheric moisture to form low-modulus polymers, such that low-modulus, moisture-curing adhesive and sealant preparations can be prepared from these prepolymers with the aforementioned auxiliary substances and additives.

The embodiment examples below are intended to illustrate the invention in more detail, wherein the choice of examples is not intended to limit the scope of the subject matter of the invention.

EXAMPLES

DMC catalysts derived in accordance with the following document were used in the production of the polyols:
a) Modification a According to Shell (U.S. Pat. No. 4,477, 589, Example 6, Accelerated Variant)
Polyol 1: Production of PPG-PEG1000-PPG Block Copolymer 63 g of PEG ($M_n$ 1000) were placed in a 2-liter reactor and cured overnight. Then 200 ppm of DMC catalyst were added, the reactor was freed three times from traces of water and air, and 583 g of propylene oxide were added over four hours at 110° C. Following the addition the mixture is stirred for one hour and the batch topped up with 300 ppm of pentaerythritol tetrakis[3-(3,5-di-tert-butyl-4-hydroxyphenyl)propionate] (Irganox 1010) to stabilize it. Polyol 1 has a hydroxyl value of 13 at a viscosity of 5000 mPas at room temperature.

Polyol 2: Production of PPG-PTHF1000-PPG Block Copolymer 63 g of poly-THF ($M_n$ 1000) were placed in a 2-liter reactor and cured overnight. Then 200 ppm of DMC catalyst were added, the reactor was freed three times from traces of water and air, and 580 g of propylene oxide were added over four hours at 110° C. Following the addition the mixture is stirred for one hour and the batch topped up with 300 ppm of Irganox 1010 to stabilize it. Polyol 2 has a hydroxyl value of 13 at a viscosity of 7500 mPas at room temperature.

Polyol 3: Production of PPG-PTHF2000-PPG Block Copolymer 83 g of poly-THF ($M_n$ 2000) were placed in a 2-liter reactor and cured overnight. Then 200 ppm of DMC catalyst were added, the reactor was freed three times from traces of water and air, and 470 g of propylene oxide were added over four hours at 110° C. Following the addition the mixture is stirred for one hour and the batch topped up with 300 ppm of Irganox 1010 to stabilize it. Polyol 3 has a hydroxyl value of 14 at a viscosity of 12,800 mPas at room temperature.

Polyol 4: Production of PPG-PTHF2000-PPG Block Copolymer 117 g of polybutadienol from Sartomer ($M_n$ 5000) were placed in a 2-liter reactor and cured overnight. Then 200 ppm of DMC catalyst were added, the reactor was freed three times from traces of water and air, and 383 g of propylene oxide were added over four hours at 110° C. Following the addition the mixture is stirred for one hour and the batch topped up with 300 ppm of Irganox 1010 to stabilize it.

Polyol 4 is obtained in a yield of 471 g and has a hydroxyl value of 14 at a viscosity of 12,800 mPas at room temperature.

Production of Urea-Bonded Alkoxysilanes

Production of Secondary Aminosilanes 210 g (1.2 mmol) of aminopropyl trimethoxysilane (Geniosil GF 96) are slowly added to 140 g (1.2 mmol) of tert-butyl acrylate and the mixture is stirred for 8 hours at room temperature. The end of the reaction is indicated by means of IR spectroscopy. The product is introduced into a moisture-proof container and used for the production of the following silane-terminated polyurethanes.

General Production Procedure for Urea-Bonded Alkoxysilanes 0.7 g of Catalyst 315 (OMG-Borchers) are added to 300 g of polyol and the mixture is dried for one hour at 80° C. Then 12 g of TDI-100 are added at 80° C. and the mixture is stirred at 80° C. until the theoretical NCO value is determined by titrimetry. Then 24.6 g of an aminosilane adduct (produced according to the above procedure) are added and the mixture is stirred for one hour. 7 g of vinyl trimethoxysilane (Geniosil XL 10) and 5 g of a sterically hindered amine (Tinuvin 765) are added to the batch to stabilize it.

Production

Comparative Example 282 g (15 mmol) of polypropylene glycol 18000 (hydroxyl value=6.0) were dried in a 500 ml three-necked flask at 100° C. under vacuum. 0.1 g of Catalyst 315 (OMG-Borchers) was added at 80° C. under a nitrogen atmosphere and then 7.0 g (31 mmol) of isocyanatopropyl trimethoxysilane (% NCO=18.4) were added. After stirring for one hour at 80° C. the polymer formed was cooled and mixed with 6 g of vinyl trimethoxysilane and 4.5 g of Tinuvin 765.

The products produced according to the general production procedure for urea-bonded alkoxysilanes and according to the comparative example are referred to in the following list and in Table 1 as "polymer".

| Starter | OH value | Viscosity of polymer in mPas |
|---|---|---|
| Polyol 1 | 12.8 | 34,000 |
| Polyol 2 | 13.3 | 80,400 |
| Polyol 3 | 14.8 | 77,600 |
| Polyol 4 | 14.4 | 195,000 |
| Comparison | 6 | 32,000 |

The silane-terminated polymers were then tested in an adhesive formulation. The results are summarized in Table 1.

TABLE 1

| | | Comparison | Polyol 1 | Polyol 2 | Polyol 3 | Polyol 4 |
|---|---|---|---|---|---|---|
| Polymer | | | | | | |
| Polymer | % parts by wt. | 28.00 | 28.00 | 28.00 | 28.00 | 28.00 |
| Plasticizer | | | | | | |
| Diisoundecyl phthalate (DIUP) | | 12.50 | 12.50 | 12.50 | 12.50 | 12.50 |
| Fillers | | | | | | |
| Omya 302 | | 57.00 | 57.00 | 57.00 | 57.00 | 57.00 |
| Additives | | | | | | |
| Dynasylan VTMO/Geniosil XL10 | % parts by wt. | 1.40 | 1.40 | 1.40 | 1.40 | 1.40 |
| Dynasylan AMMO/Geniosil GF96 | % parts by wt. | 1.00 | 1.00 | 1.00 | 1.00 | 1.00 |
| Catalyst | | | | | | |
| DBTL (4 drops = 0.11 g) | % parts by wt. | 0.10 | 0.10 | 0.10 | 0.10 | 0.10 |
| Total | | 100.00 | 100.00 | 100.00 | 100.00 | 100.00 |
| Results after 7 days | | | | | | |
| SOT in min (conditioning chamber) | | — | 20 | 30 | 30 | 17 |
| Set in mm | | 1.90 | 2.35 | 2.25 | 2.10 | 1.90 |
| Beech/beech (N/mm$^2$) | | 2.90 | 3.80 | 3.50 | 4.40 | 3.08 |
| Aluminum/beech (N/mm$^2$) | | 2.50 | 3.26 | 3.35 | 4.18 | 2.93 |
| ABS/beech (N/mm$^2$) | | 0.48 | 1.70 | 1.35 | 1.32 | 0.47 |

The results demonstrate that compositions based on urea-bonded alkoxysilane polymers according to the invention exhibit both a significantly improved adhesive spectrum and better strength values than a comparable formulation based on a silane-terminated polyether urethane.

What is claimed is:

1. Reactive, urea-bonded alkoxysilanes, obtained by reacting an OH-terminated polyether block copolymer of the structure B-A$_n$, in which n is equal to 2 to 10 and in which the central block B consists of polyoxytetramethylene, polyoxyethylene, polybutadiene, polyisoprene, polyacrylate, polymethacrylate, polyamide, polyurethane or polyester units and the blocks A consist of polyoxypropylene units, with a stoichiometric excess of diisocyanate to form an NCO-terminated prepolymer Q; and subsequent reaction of the prepolymer Q with a silane compound of the formula (1),

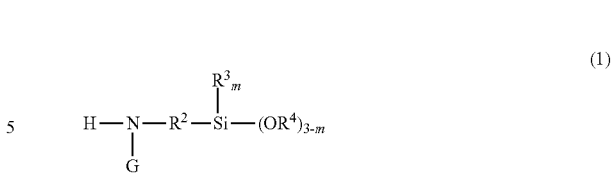

(1)

in which G is an organic group or hydrogen, R$^2$ is a divalent alkylene group having 1 to 10 carbon atoms or a —(CH$_2$)$_o$—NR$^1$—(CH$_2$)$_p$ group, in which o and p are identical or different and equal to 2 to 6 and R$^1$ is an organic group having a maximum of 10 carbon atoms, R$^3$ is a linear or branched alkyl residue having 1 to 6 carbon atoms, R$^4$ is a linear or branched alkyl residue having 1 to 4 carbon atoms and m is equal to 0, 1 or 2.

2. The reactive, urea-bonded alkoxysilanes according to claim 1, wherein the group G is represented by the following formulae (2) to (5):

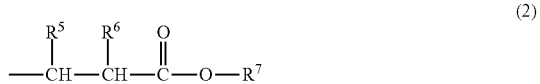

(2)

(3)

(4)

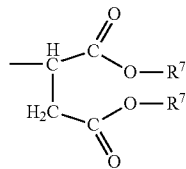
(5)

in which $R^5$ and $R^6$ independently of each other are a hydrogen atom or a methyl group, $R^7$ is a linear or branched alkyl residue having 1 to 6 carbon atoms and $R^8$ is a linear or branched alkyl residue having 1 to 8 carbon atoms.

3. The reactive, urea-bonded alkoxysilanes according to claim 1, wherein the polyether blocks A have a polydispersity PD ($M_w/M_n$) of less than 2.5.

4. The reactive, urea-bonded alkoxysilanes according to claim 1, wherein the polyether block copolymer of the structure B-A$_n$ has a molecular weight Mn of between 4000 and 100,000 g/mol (daltons).

5. The reactive, urea-bonded alkoxysilanes according to claim 1, wherein n is equal to 2.

6. A method for producing a urea-bonded alkoxysilane, comprising:
reacting at least one OH-terminated polyether compound of the structure B-A$_n$, in which n is equal to 2 to 10 and the central block B consists of polyoxytetramethylene, polyoxyethylene, polybutadiene, polyisoprene, polyacrylate, polymethacrylate, polyamide, polyurethane or polyester units and the blocks A consist of polyoxypropylene units, with a stoichiometric excess of a diisocyanate to form an NCO-terminated prepolymer,
followed by reacting the NCO-terminated prepolymer with a silane compound of the formula (1):

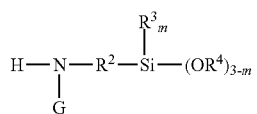
(1)

in which G is an organic group or hydrogen, $R^2$ is a divalent alkylene group having 1 to 10 carbon atoms or a —(CH$_2$)$_o$—NR$^1$—(CH$_2$)$_p$ group, in which o and p are identical or different and equal to 2 to 6 and $R^1$ is an organic group having a maximum of 10 carbon atoms, $R^3$ is a linear or branched alkyl residue having 1 to 6 carbon atoms, $R^4$ is a linear or branched alkyl residue having 1 to 4 carbon atoms and m is equal to 0, 1 or 2.

7. The method according to claim 6, wherein the OH-terminated polyether compound of the structure B-A$_n$ has an OH value according to DIN 53783 of between 3 and 56 mg KOH/g.

8. The method according to claim 6, wherein after reacting the OH-terminated polyether compound with the diisocyanate the unreacted monomeric diisocyanate is removed from the reaction mixture.

9. The method according to claim 6, wherein the diisocyanate is selected from the group consisting of 2,4-toluene diisocyanate, 2,6-toluene diisocyanate, 4,4'-diphenylmethane diisocyanate, 2,4'-diphenylmethane diisocyanate, 1-isocyanato-3,3,5-trimethyl-5-isocyanatomethyl cyclohexane (isophorone diisocyanate, IPDI), 4,4'-dicyclohexylmethane diisocyanate isomers, tetramethylxylylene diisocyanate (TMXDI), and mixtures thereof.

10. An adhesive, sealant or coating composition comprising one or more urea-bonded alkoxysilanes according to claim 1.

11. A urea-bonded alkoxysilane of general formula (6)

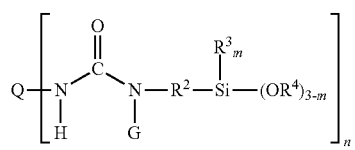
(6)

in which m is equal to 0, 1 or 2; n is equal to 2 to 10;
Q is an n-valent residue having a block structure B-A$_n$, in which n is independently 2 to 10 and in which block B consists of polyoxytetramethylene, polyoxyethylene, polybutadiene, polyisoprene, polyacrylate, polymethacrylate, polyamide, polyurethane or polyester units and block A consists of polyoxypropylene units;
G is an organic group or hydrogen;
$R^2$ is a divalent alkylene group having 1 to 10 carbon atoms or a —(CH$_2$)$_o$—NR$^1$—(CH$_2$)$_p$ group, in which o and p are identical or different and equal to 2 to 6;
$R^1$ is an organic group having a maximum of 10 carbon atoms;
$R^3$ is a linear or branched alkyl residue having 1 to 6 carbon atoms; and
$R^4$ is a linear or branched alkyl residue having 1 to 4 carbon atoms.

12. The urea-bonded alkoxysilane of claim 11 wherein Q is the residue of an NCO-terminated prepolymer prepared by reacting diisocyanate with an OH-terminated polyether block copolymer of the structure B-A$_n$, in which n is independently 2 to 10 and in which block B consists of polyoxytetramethylene, polyoxyethylene, polybutadiene, polyisoprene, polyacrylate, polymethacrylate, polyamide, polyurethane or polyester units and in which the block A consists of polyoxypropylene units.

13. The urea-bonded alkoxysilane of claim 11 wherein $R^2$ is a divalent alkylene group having 1 to 3 carbon atoms and m is equal to 0 or 1.

14. The urea-bonded alkoxysilane of claim 11 wherein $R^3$ and $R^4$ are independently selected from methyl, ethyl, propyl or butyl residues.

15. The urea-bonded alkoxysilane of claim 11 wherein $R^3$ and $R^4$ are each methyl residues.

* * * * *